US008867403B2

(12) United States Patent
Biswas et al.

(10) Patent No.: US 8,867,403 B2
(45) Date of Patent: Oct. 21, 2014

(54) VIRTUAL NETWORK OVERLAYS

(75) Inventors: Amitabha Biswas, San Francisco, CA (US); Jayakrishna Kidambi, San Jose, CA (US); Nilanjan Mukherjee, Santa Clara, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 13/212,790

(22) Filed: Aug. 18, 2011

(65) Prior Publication Data

US 2013/0044629 A1 Feb. 21, 2013

(51) Int. Cl.
*H04L 12/28* (2006.01)
*H04L 12/931* (2013.01)
*H04L 12/715* (2013.01)
*H04L 12/46* (2006.01)
*H04L 29/08* (2006.01)

(52) U.S. Cl.
CPC ............... *H04L 45/64* (2013.01); *H04L 49/00* (2013.01); *H04L 12/4633* (2013.01); *H04L 67/2804* (2013.01); *H04L 12/4679* (2013.01); *H04L 49/356* (2013.01); *H04L 49/70* (2013.01)
USPC ........................................................ 370/254

(58) Field of Classification Search
USPC ............................. 370/254, 473, 390, 395.53
See application file for complete search history.

(56) References Cited

U.S. PATENT DOCUMENTS

| 8,155,146 | B1 * | 4/2012 | Vincent et al. ................ 370/473 |
| 2009/0037607 | A1 | 2/2009 | Farinacci et al. | |
| 2011/0035494 | A1 | 2/2011 | Pandey et al. | |
| 2011/0090911 | A1 | 4/2011 | Hao et al. | |
| 2011/0103389 | A1 | 5/2011 | Kidambi et al. | |
| 2011/0110377 | A1 | 5/2011 | Alkhatib et al. | |
| 2011/0119748 | A1 | 5/2011 | Edwards et al. | |
| 2011/0310899 | A1 | 12/2011 | Alkhatib et al. | |
| 2011/0320821 | A1 | 12/2011 | Alkhatib et al. | |
| 2012/0014387 | A1 * | 1/2012 | Dunbar et al. ........... 370/395.53 |
| 2012/0176934 | A1 * | 7/2012 | Farinacci et al. ............ 370/254 |
| 2012/0250682 | A1 * | 10/2012 | Vincent et al. ................ 370/390 |
| 2013/0034094 | A1 | 2/2013 | Cardona et al. | |
| 2013/0205042 | A1 | 8/2013 | Cohn | |

OTHER PUBLICATIONS

International Search Report and Written Opinion for counterpart application No. PCT/IB2012/053679 dated Dec. 20, 2012, 7 pages.
English translation for Chinese application No. CN101326771A dated Dec. 17, 2008, 1 page.
Yu, Wei; "Providing Efficient Virtual Cooperation Services for Large Scale Networks"; Proceedings-2004; 12th IEEE International Conference on Networks; Dec. 1, 2004; pp. 160-164.
Non-Final Office Action in related U.S. Appl. No. 13/454,840, mailed on Nov. 7, 2013 (14 pages).
Final Office Action in related U.S. Appl. No. 13/454,840, mailed on Mar. 7, 2014; 15 pages.
Non-Final Office Action in related U.S. Appl. No. 13/454,840, mailed on Jun. 9, 2014; 7 pages.

* cited by examiner

*Primary Examiner* — Albert T Chou
(74) *Attorney, Agent, or Firm* — Schmeiser, Olsen & Watts LLP

(57) ABSTRACT

Systems are provided for overlaying a virtual network on a physical network in a data center environment. An overlay system is arranged in an overlay virtual network to include an overlay agent and an overlay helper. The overlay agent is implemented in an access switch. The overlay helper is implemented in an end station that is in communication with the access switch. Overlay parameters in compliance with an in-band protocol are transmitted between the overlay agent and the overlay helper.

7 Claims, 11 Drawing Sheets

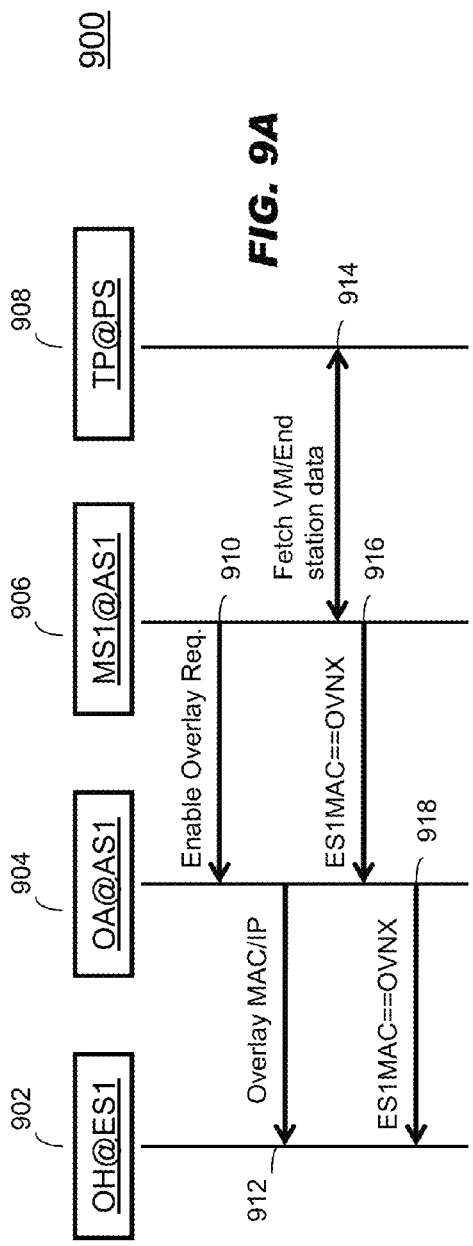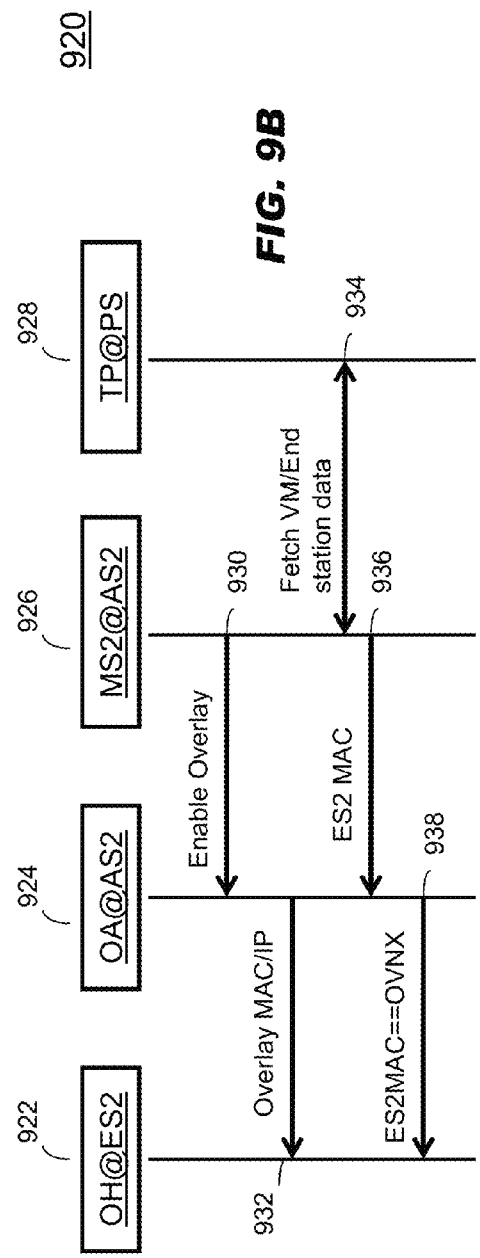

VIRTUAL NETWORK OVERLAYS

FIELD OF THE INVENTION

The present inventive concepts relate generally to network virtualization. More particularly, the present inventive concepts relate to systems for overlaying a virtual network on a physical network.

BACKGROUND

Server virtualization in data centers or related environments is a key enabling technology for cloud computing. In general, server virtualization describes a software abstraction that separates a physical resource and its use from the underlying physical machine. Most physical resources can be abstracted and provisioned as virtualized entities. Accordingly, a single physical machine can host a plurality of virtual machines, each having its own operating system, referred to as a guest operating system (OS), thereby allowing multiple users to share the physical machine.

The desire to overlay virtual networks on physical networks within a data center environment provides several benefits. One well-known benefit is that virtual networks can simplify network provisioning for the data center client in public, private, or multi-tenant cloud environments.

SUMMARY

In one aspect, the present inventive concepts feature an overlay system for a network virtualization environment. The overlay system includes an overlay agent at an access switch at the edge of a network. The overlay agent is configured to generate an overlay encapsulation field that includes overlay parameters related to a destination end station. The overlay system also includes an overlay helper at a host computer in communication with the access switch. The overlay helper is configured to add the overlay encapsulation field to a first packet and transmitting the first packet including the overlay encapsulation field to the destination end station.

In another aspect, the present inventive concepts feature a data center environment. The data center environment comprises a network edge switch, a host computer, and an overlay system. The host computer is in communication with the access switch via a local area network connection. The overlay system comprises an overlay agent at the access switch and an overlay helper at the host computer. The overlay agent is configured to generate an overlay encapsulation field that includes overlay parameters related to a destination end station. The overlay helper is configured to add the overlay encapsulation field to a packet and transmit the packet including the overlay encapsulation field to the destination end station.

In another aspect, the present inventive concepts feature a computer program product for overlaying a virtual network on a physical network in a data center environment. The computer program product comprises a computer readable storage medium having computer readable program code embodied therewith. The computer readable program code comprises computer readable program code configured to arrange an overlay system in an overlay virtual network to include an overlay agent and an overlay helper. The computer readable program code further comprises computer readable program code configured to implement the overlay agent in an access switch. The computer readable program code comprises computer readable program code configured to implement the overlay helper in an end station that is in communication with the access switch. The computer readable program code comprises computer readable program code configured to transmit overlay parameters in compliance with an in-band protocol between the overlay agent and the overlay helper.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 9A is a schematic block diagram illustrating a process flow for initializing a source overlay system, in accordance with an embodiment;

FIG. 9B is a schematic block diagram illustrating a process flow for initializing a destination overlay system, in accordance with an embodiment;

DETAILED DESCRIPTION

Figure 1:
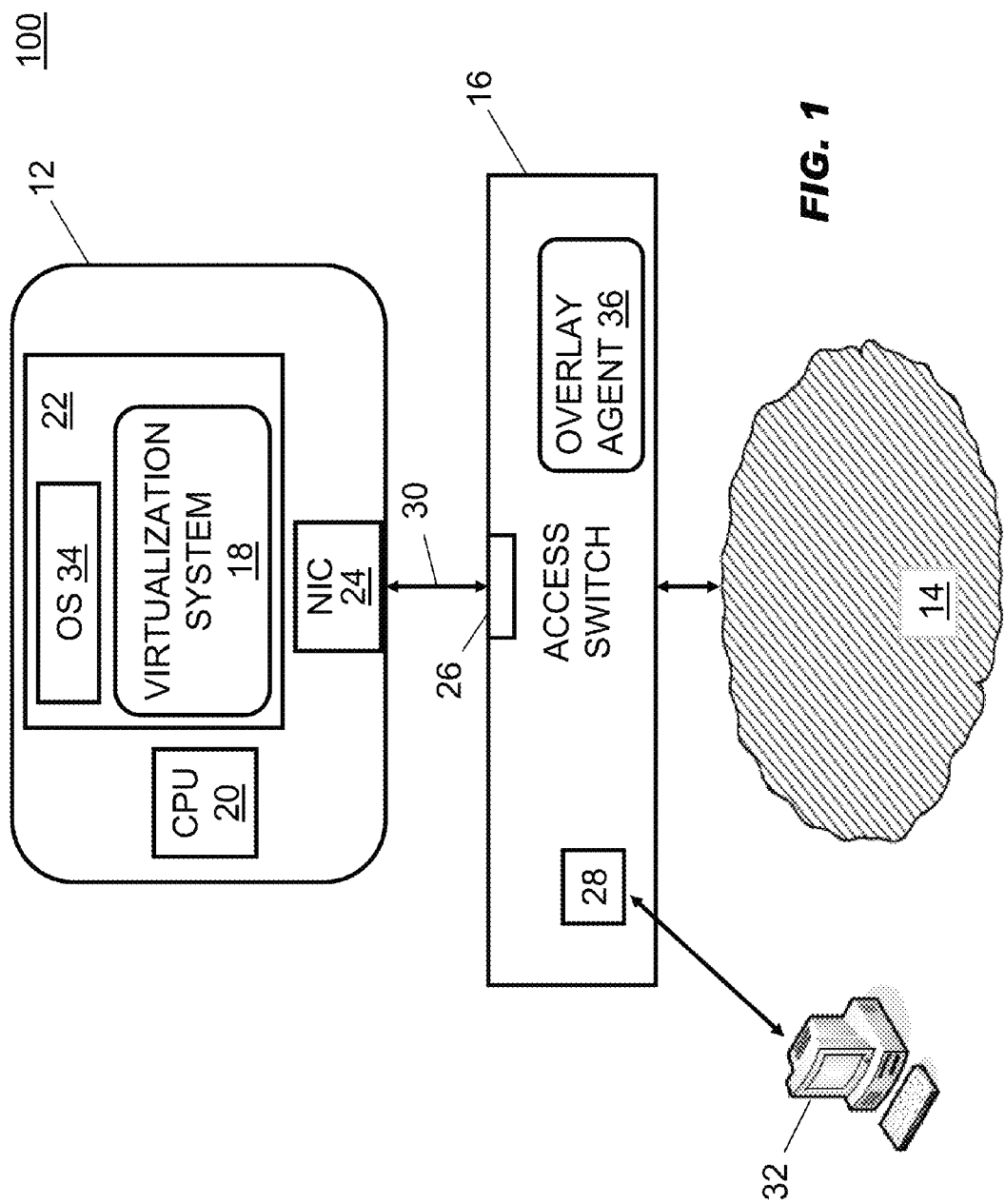
FIG. 1 is a block diagram of a data center environment in which embodiments of the present inventive concepts can be employed.

In the following description, specific details are set forth although it should be appreciated by one of ordinary skill that the systems and methods can be practiced without at least some of the details. In some instances, known features or processes are not described in detail so as not to obscure the present invention.

An overlay network typically includes a plurality of overlay agents located at the edge of a physical network. Each overlay agent is configured to classify packets transmitted by a corresponding end station, for example, by mapping packets from a given end station to a virtual network and vice versa. The overlay agents can also add an overlay header to the packets directed to a destination end station, which is populated with virtual network overlay parameters provided by a network management station or a policy server. The parameters can include information for identifying the virtual network of a transmitted packet and for allowing the packet to be transmitted from an overlay agent in communication with the source end station through the physical network to another overlay agent in communication with the destination end station, preferably located in the same virtual network as the source end station. The receiving overlay agent can determine the correct destination end station from the overlay header, for example, from the virtual network identifier provided in the overlay header.

A limitation associated with conventional overlay configurations is that legacy network devices such as Ethernet switches cannot participate in an overlay operation, since, for example, conventional Ethernet switches cannot recognize the overlay header added to a packet by a source overlay agent, and therefore cannot process the contents of the overlay header such as the virtual network identifier required for determining the correct destination for the packet.

One conventional approach is to provide a server virtualization environment that includes virtual switches, or vswitches, which adds Ethernet or related switching services to virtual machines. Since virtual switches are implemented in the host server software and have access to sufficient amounts of memory and CPU, they can be modified to operate as overlay agents. Examples of virtualization software products that can be used in conjunction with virtualization-aware network switches can include XenSource™ produced by Citrix Systems, Inc., Hyper-V™ produced by Microsoft Corp., VMware®, or open-source software such as Kernal-Based Virtual Machine (KVM).

In a conventional server virtualization environment, non-virtualized end stations cannot be part of an overlay network. Also, virtualization-based solutions rely on vendor-specific virtualization software for implementing the virtual machines on the physical host server, and therefore rely on the availability of proprietary virtual switch extensions and their acceptance on the respective virtual switch platform. Significant development and support resources are required to implement and maintain such an environment.

In brief overview, aspects of the present inventive concepts include an overlay system that is implemented in both a network access switch and a host server, permitting virtualized and non-virtualized network entities alike to be part of the same overlay virtual network. The overlay system includes an overlay agent and a corresponding overlay helper. The overlay agent runs on an access switch or other network edge device to which one or more virtual and/or physical end stations are connected. The overlay helper runs on a host computer, for example, at the Ethernet layer of a network interface controller (NIC) device driver, firmware, or hardware in a conventional non-virtualized server, or in the device driver at a hypervisor of a virtualized server. The overlay agent and the overlay helper communicate with each other by exchanging virtualization parameters and the like via an in-band protocol, for example, a hop-by-hop layer-2 protocol.

In this manner, a highly scalable virtual network environment can be provided by implementing the overlay system in a form of program code, or software, in an access switch and an end station NIC, for example, under the end station's operating system, where overlay network characteristics can be defined in software as an alternative to firmware. Accordingly, an overlay configuration is not required to reside entirely at the edge of a physical network, or to reside entirely in a virtualization server. Thus, so long as an end station is configured with an overlay helper that communicates with the overlay agent in the access switch, both virtualized and non-virtualized end stations can be part of the virtual network domain. Implementing the overlay system in this manner can improve scaling by pooling the resources of the access switch and the network adapter. Otherwise, if the access switch alone included an overlay configuration, the access switch would be required to process overlay-related communications for multiple ports, resulting in an increase in hardware complexity and resources. Since a server-resident network adapter processes a subset of the end stations that are local to it, the requirements on the adapter are less intensive; thus, an access switch can offload the handling of certain data plane overlay functions to a server-resident adapter.

FIG. 1 is a block diagram of a data center environment 100 in which embodiments of the present inventive concepts can be employed. In general, the data center environment 100 can include one or more locations that serve as a computational, storage, and networking center for an organization. The equipment of the data center environment 100 can reside together locally at a single site or can be distributed over two or more separate sites.

The data center environment 100 can include one or more host computers 12 in communication with a network 14 through an access switch 16. Although not shown, the data center environment 100 can include one or more aggregator and gateway switches interposed between the access switch 16 and the network 14, and/or other well-known data center equipment. The access switch 16 and/or related data center equipment can be considered part of the network 14. The network 14 can be, for example, an intranet, an extranet, the Internet, a local area network (LAN), wide area network (WAN), or a metropolitan area network (MAN), or any combination thereof. The host computer 12 can communicate with the access switch 16 via another network 30, for example, an Ethernet LAN, or via a direct connection. Alternatively, network 30 can be part of the network 14 such that the host computer 12 communicates directly with the network 14.

The host computer 12 can be an embodiment of a physical computing device, such as a server or a blade. The host computer 12 can reside alone or be installed in a chassis with other host computers, for example, as in a rack server or in a blade server. The access switch 16 can reside alone or be installed within the same equipment chassis as the host computer 12.

The host computer 12 can include one or more processing devices 20 such as a CPU, and can further include a memory device 22 and a physical network input/output (I/O) adapter 24 having at least one physical network interface (NIC). The physical components of the host computer 12, e.g., the CPU 20, the memory device 22, and the I/O adaptor 24, can communicate with each via one or more busses, connectors, adaptors, and the like known to those of ordinary skill in the art. The host computer 12 can run a virtualization system 18, which can optionally include a hypervisor or a virtual machine manager (VMM). In other embodiments, the host computer 12 can be a non-virtualized server or a server blade.

The memory 22 can include volatile memory, for example, RAM and the like, and/or non-volatile memory, for example, ROM, flash memory, and the like. The memory can include removable and/or non-removable storage media implemented in accordance with methods and technologies known to those of ordinary skill in the art for storing data. Stored in the memory can include program code, such as program code of an operating system 34 executed by the processor 20, and/or program code corresponding to a virtualization system 18.

The NIC 24 provides support in hardware, software, or a combination thereof for any form of I/O virtualization. Examples include, but are not limited to, SR-IOV NICs and non-SR-IOV NICs, multi-queue NICs, network interface controllers, I/O adapters, and converged network adapters. The NIC 24 can be managed by the server operating system 34, a NIC driver, and the like so that the NIC 24 can receive and transmit data to and from the network 30, described in detail below. In addition to handling the network I/O to and from the access switch 16, the NIC 24 provides for a communication path between virtual machines (not shown), for example, exchanging packets with a virtual NIC (vNIC) of a virtual machine.

The access switch 16 includes a plurality of physical uplink and downlink ports 26 that communicate with the NIC 24, more specifically, with a physical port (not shown) of the NIC 24. In general, the access switch 16 is a network element, for example, implemented as an Ethernet switch, for switching computers between uplink and downlink ports 26, and between virtual machines executing on the same host computer 12. An example implementation of the physical link between the host computer 12 and the access switch 16 is a 10 Gb Ethernet link. An example implementation of the access switch 16 is an Ethernet switch, e.g., a 24-port 10 Gb Ethernet switch module manufactured by Blade Network Technologies, Inc. of Santa Clara, Calif. In other embodiments, switching can occur at a network adapter configured with elements of an overlay system. Here, switching can occur between virtual machines in communication with the network adapter, and/or with an access switch.

The access switch 16 can be configured with a management module 28 for performing intra-hypervisor VM-to-VM switching and the like. A remote management station 32 can control and manage the access switch 16 and/or the host computer 12 via the management module 28. The access switch 16 can include an overlay agent 36 in communication with an external policy server and/or the management station 32 via a management module 28 for providing network topology information, classifying packets, etc. The overlay agent 36 is configured to perform a virtual network overlay operation, for example, enabling two or more end stations to communicate in the overlay virtual network.

Figure 2:
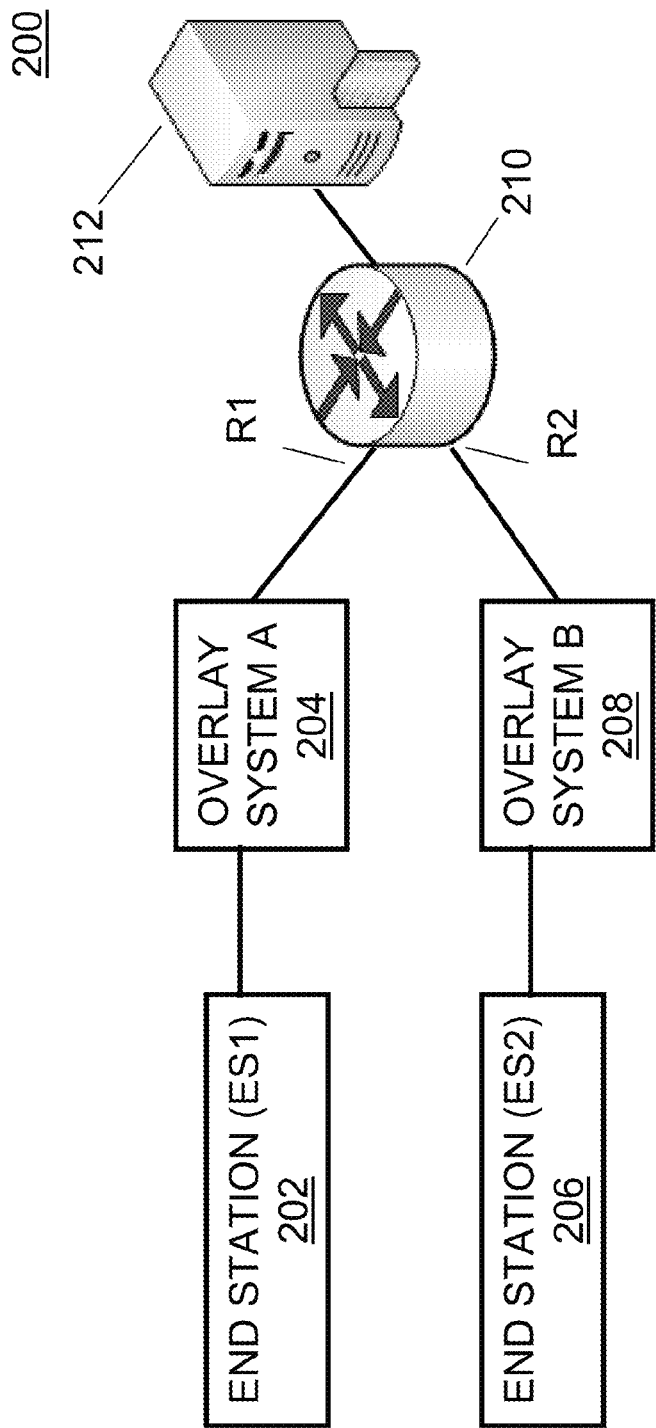
FIG. 2 is a block diagram of an environment in which two end stations are in a same overlay virtual network, in accordance with an embodiment.

FIG. 2 is a block diagram of an environment 200 in which two end stations 202, 206 are in a same overlay virtual network, in accordance with an embodiment. End stations 202, 206 can exchange data packets with each other via a router 212. One or more access switches (not shown) can be positioned between end stations 202, 206 and a router 210. In an embodiment, end stations 202, 206 are configured for different physical subnets, and can be members of a common virtual network. Accordingly, the router 212 includes a first subnet interface R1 for servicing a first subnet of which end station 202 is a member, and a second subnet interface R2 for servicing a second subnet of which end station 206 is a member. In other embodiments, end stations 202, 206 are configured as part of a same physical network, for example, a physical layer-2 network, or on a same subnet, for example, a same layer-3, e.g., IP, subnet. For purposes of describing operations performed in the environment 200, overlay system 204 of FIG. 2 can be referred to as a source overlay system, and overlay system 208 of FIG. 2 can be referred to as a destination overlay system. In an embodiment as shown in FIG. 2, the environment 200 includes an IP network. In other embodiments, the environment 200 includes a layer-2 network.

End station 202 is in communication with overlay system A 204 and end station 206 is in communication with overlay system B 208. Overlay system A 204 and/or overlay system B 206 can service multiple end stations. Overlay systems 204, 206 can communicate with each other when performing an overlay operation, for example, described below. End station 202 and/or end station 206 can be virtualized end stations. Alternatively, end station 202 and/or end station 206 can be non-virtualized end stations. The environment 200 can therefore include a combination of virtualized and non-virtualized end stations.

Figure 3:
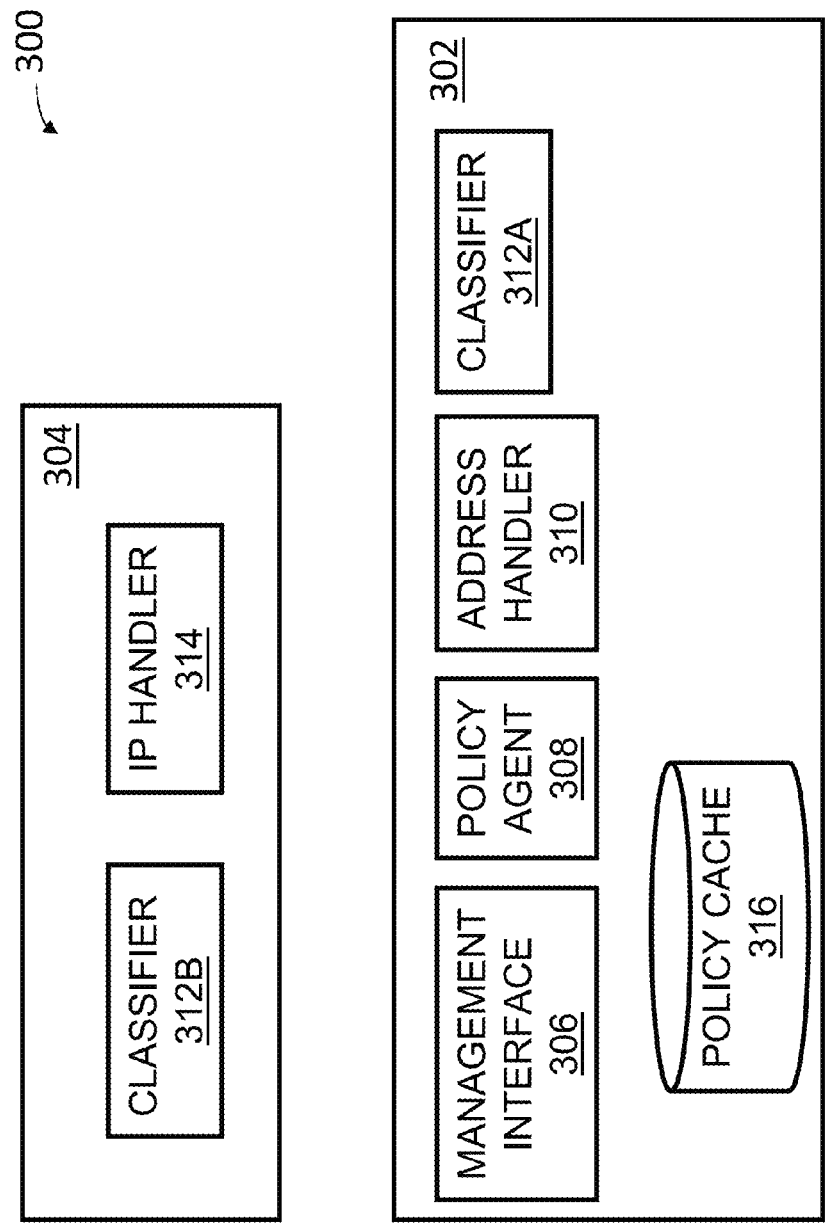
FIG. 3 is a block diagram illustrating a high-level architecture of an overlay system, in accordance with an embodiment.

FIG. 3 is a block diagram illustrating a high-level architecture of an overlay system 300, in accordance with an embodiment. The overlay system architecture described with respect to FIG. 3 can apply to overlay system A 204 and/or overlay system B 208 described with reference to FIG. 2. Thus, overlay system A 204 and overlay system B 208 each include some or all of elements of the overlay system 300. In describing FIG. 3, reference can be made to other elements of FIG. 1 and/or FIG. 2. The overlay system 300 can be configured for an IP network, a layer-2 network, or other network known to those of ordinary skill in the art.

Overlay system 300 includes an overlay agent 302 and an overlay helper 304. The overlay agent 302 can be located at the access switch 16 of FIG. 1 or the router 210 or edge switch (not shown) of FIG. 2. The overlay helper 304 can be located at the host computer 12 of FIG. 1 or end station 202 and/or end station 206 of FIG. 2, for example, in an Ethernet device driver.

The overlay agent 302 includes a management interface 306, a policy agent 308, an address handler 310, and a classifier 312A. The management interface 306 provides an interface to the management station 32 for configuring overlay parameters and providing various control and management functions to the overlay virtual network in which the overlay system 300 is implemented. For example, the management station 32 via the management interface 306 can define virtual networks and their members. The management station 32 can also interact with devices and other specialized management stations in a data center, such as network switches, virtualization managers, server managers, and the like, for performing tasks related to the management of an overlay virtual network such as constructing topology maps, determining placement criteria, and the like. In an embodiment, the management interface 306 is configured for providing a global view of the physical network and/or the virtual network to the management station 32. The management interface 306 can convey local parameters, for example, packet classification criteria, to other components of the overlay system 300. For example, the management station 32 can configure an identifier associated with a virtual network. The overlay agent 302 can then configure the classifier 312A for a pre-determined traffic classification based on a physical or virtual port number, a MAC address, and the like.

The policy agent 308 can communicate with the policy server 212, also referred to as a policy engine, to construct a policy cache containing the IP address or related data of a destination overlay agent corresponding to a destination end station in a given virtual network. The policy cache includes mappings for destination end stations that local end stations wish to communicate with. The policy server 212 can determine the location of, and obtain IP addresses for, one or more end stations in the overlay network by interacting with various components of a data center environment such as end stations 202, 206, overlay systems 204, 208, and/or edge switches (not shown) in FIG. 2. In another embodiment, the management station 32 communicates with the policy server 212 via the management interface 306 to providing mapping-related information for establishing communication paths for end stations 202, 206.

The address handler 310 receives and processes address resolution protocol (ARP) requests or layer-2-related communications from end stations 202, 206. Details of the ARP protocol are not disclosed herein for brevity since ARP is a well-known protocol used to associate IP addresses with MAC addresses or other layer 2 addresses. The address handler 310 can query the policy agent 308 for an IP address of the destination overlay agent for communicating with a target end station that is in the source end station's virtual network, and determine a next hop MAC address, for example, according to the ARP protocol, for the destination overlay agent's IP address. The next hop determination can occur via normal ARP mechanisms, for example, in the physical network. In embodiments where a layer-2 network and a corresponding layer-2 virtual network service are provided, the address handler 310 is not part of the overlay system 300. Here, packets can be classified based on a destination MAC address instead of a destination IP address. A virtual network identifier can therefore alternatively qualify a MAC address instead of an IP address.

The overlay helper 304 of the overlay system 300 includes an IP handler 314 and a classifier 312B, which is part of the classifier 312A of the overlay agent 302. The classifier 312A in the overlay agent 302 processes received data traffic, in particular, traffic destined to one of the local end stations serviced by the overlay system. The classifier 312B in the overlay helper 304 on the other hand processes packets for transmission. For example, the classifier 312B receives IP packets or layer 2 data and the like from the end station, for example, end station 202, and map the packets to a virtual network. This mapping can be configured via the management interface 306. As used herein, the classifier 312A of the overlay agent 302 and the classifier 312B of the overlay helper 304 can be referred to generally as a classifier 312. In sum, the classifier 312 maps all packets coming from a local end station to a virtual network based on a previously configured virtual port or MAC-based classification, for example, configured by the management station 32. Thus, all packets transmitted by the end station are transmitted through the classifier 312, where the classifier 312 maps the received packets to a virtual network.

The IP handler 314 receives IP packets from the end station via the classifier 312, and adds an overlay encapsulation to each received IP packet. The overlay encapsulation can include an outer overlay MAC header, an outer overlay IP header, and an overlay-specific header. The outer overlay MAC header can include a source MAC address corresponding to overlay system A 204 and a destination MAC address corresponding to the next hop IP address of the target overlay IP address. The outer overlay IP header can include the IP address of the source overlay system 204 and the IP address of overlay system B 208. The overlay-specific header can include a unique identifier that identifies the virtual network.

The IP handler 314 of the destination overlay system 208 can receive encapsulated IP packets sent from the source overlay system 204 and can locate the destination end station 206 that the packet is intended for, based on the inner IP destination, i.e., the IP address of the destination end station 206, and the virtual network identifier. The IP handler 314 of the destination overlay system 208 can communicate with the policy agent 308 to retrieve mapping information for the destination end station 206. The local destination can be derived from the packet contents and the target port can be identified from its settings. Here, a lookup may not be required. On the other hand, a lookup may be nevertheless necessary if the target has changed locations. The IP handler 314 can query the local policy agent 308, which in turn queries the global policy server 212 if the mapping is not found in the local cache. Once the end station is identified, the IP Handler 314 strips off the overlay header before forwarding the packet frame to the destination end station 206.

Figure 4:
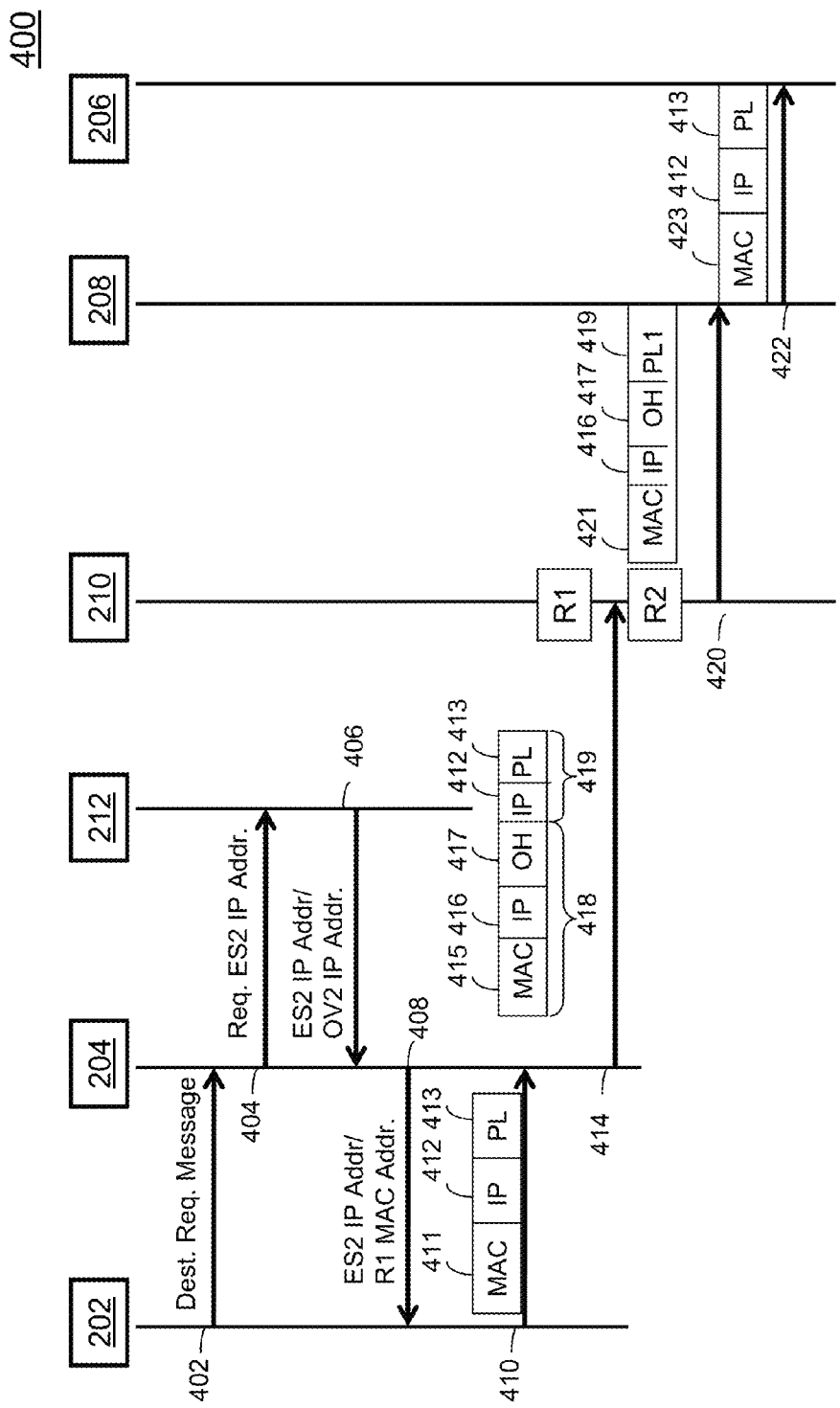
FIG. 4 is a schematic block diagram illustrating a process flow for communicating between the end stations and the overlay systems of FIG. 2, in accordance with an embodiment.

FIG. 4 is a schematic block diagram illustrating a process flow 400 for communicating between the end stations 202, 206 and overlay systems 204, 208 of FIG. 2, in accordance with an embodiment. In describing the process flow 400, reference is also made to FIGS. 1-3. The process flow 400 can be governed by instructions that are stored in a memory device and executed by a processor of at least one of end station 202, end station 206, router 210, policy server 212, and/or one or more intervening switches (not shown) between end stations 202, 206 and the router 210. In FIG. 4, end station 202 can be referred to as a source end station and end station 206 can be referred to as a destination end station. Also in FIG. 4, overlay system A 204 can be referred to as a source overlay system, and overlay system B 208 can be referred to as a destination overlay system. Although overlay systems 204, 208 are referred to herein, the overlay system 300 described in FIG. 3 equally applies.

A destination request message is output (402) from end station 202 to overlay system A 204, for example, output as a broadcast message. The broadcast message can be output in a well-known manner, for example, issued according to the ARP for address resolution. Alternatively, the destination request message can be output in a layer-2 format. Here, the policy cache can be updated when a unicast message to the destination endpoint is received by the overlay system 300.

The source overlay system 204 can receive the destination request message, whereby the address handler 310 of the overlay agent 302 of the source overlay system 204 can query the policy agent 308 for the IP address of the destination overlay system 208 related to the destination end station 206 in a predefined virtual network. The policy agent 308 of the source overlay system 204 can first access its policy cache (not shown), which can store mapping information related to the destination overlay system 208 of the destination end station 206 to which the source end station 202 wishes to communicate. If such mapping information is not found in the policy cache, then the address handler 310 can output (404) a message, for example, a unicast message, to the policy server 212 to obtain the mapping information. In particular, the overlay system 300 requests the policy server 212 for the location of the target overlay system to which the destination endpoint 206 is attached in the same virtual network as the source endpoint 202. The policy server 212 can determine the physical location of the destination end station 206 by interacting with elements of the data center and with the source overlay system 204.

Assuming that the policy server 212 determines the location of the destination end station 206 and can provide the requested mapping information, the policy server 212 can output (406) the requested mapping information, specifically, a mapping of the IP address of the destination end station 206 to the destination overlay system 208. For example, the address handler 310 can query the policy cache, and if not found there, the policy agent 308 contacts the policy server 212 to retrieve the mapping information and return it to the address handler 310. The address handler 310 can then fulfill the ARP request originating from the local end station, i.e., the source endpoint 202. In addition, the policy agent 308 can communicate with the policy server 212 to determine the location of the destination end station 206, and to update the policy cache with the mapping information.

The address handler 310 of the source overlay system 204 can output (408) the IP address of the destination end station 206 and a corresponding next hop MAC address generated in response to the original ARP request to the end station 202. After address resolution, the source end station 202 can output (410) a packet that includes a layer-2, e.g., Ethernet, header 411, an IP header 412, and a payload (PL) 413. The layer-2 header 411 can include the next hop MAC address (R1 MAC Addr.) and the destination IP address (ES2 IP Addr.) received from the policy server 212 and/or the policy agent 308.

The overlay system A 204, in particular, the IP handler 314, receives the packet from the end station 202. The IP handler 314 adds an overlay encapsulation 418 to the packet and outputs (414) the encapsulated packet. The overlay encapsulation 418 includes an outer overlay MAC header 415, an outer overlay IP header 416, and an overlay header 417. An optional layer-4 header (not shown), for example, a UDP header, can be positioned between the IP header 416 and the overlay header 417. The outer overlay MAC header 413 includes a source MAC address (omac1) corresponding to the source overlay system 204 and a destination MAC address, e.g., the next hop MAC address (rmac1). In an embodiment, if the target is in the same subnet as the source, then the destination MAC address is that of the destination overlay system 208. In another embodiment, as shown in FIG. 2, the destination MAC address is that of a gateway interface (R1) that routes packets between the subnets of the end stations 202, 206, respectively.

The outer overlay IP header 416 can include the IP address of the source overlay system 204 and the IP address of the destination overlay system 208. The overlay header 417 can include a unique identifier that identifies the virtual network. When the overlay encapsulation 418 is added to the packet received from the source end station 202, the contents of the original packet 411, 412, 413 are combined to form a new payload PL1 419, which is output (414) with the overlay encapsulation 418 to the router 210, or alternatively to an edge switch or related network switch.

The router 210, specifically, a first subnet interface R1 of the router 210 identified from the next hop MAC address, receives the packet with the payload PL1 419, and outputs (420) the payload PL1 419 as well as contents the overlay header 417 and the outer overlay IP header 416 from a second interface R2 that services a second subnet of which destination end station 206 and/or destination overlay system 208 is a member. A MAC address header 421 is added which includes the source MAC address, i.e., the MAC address of the second router interface R2, and the MAC address of the destination overlay agent 208 corresponding to the IP address of the destination overlay system 208 in the outer overlay IP header 416.

Overlay system B 208 can remove the overlay header 417 from the packet received from the router 210, and output the original payload 413 to the destination end station 206. The IP handler 314 of the destination overlay system 208 can determine the intended destination end station for receiving the packet based on the inner IP destination (esip2) provided in the destination IP address field 412 and virtual network information, for example, a unique virtual network identifier, in the overlay header 417. Overlay system B 208 can use this information to determine the destination end station 206, and to output (422) a data packet including the original payload 413 to the destination end station 206.

Figure 5:
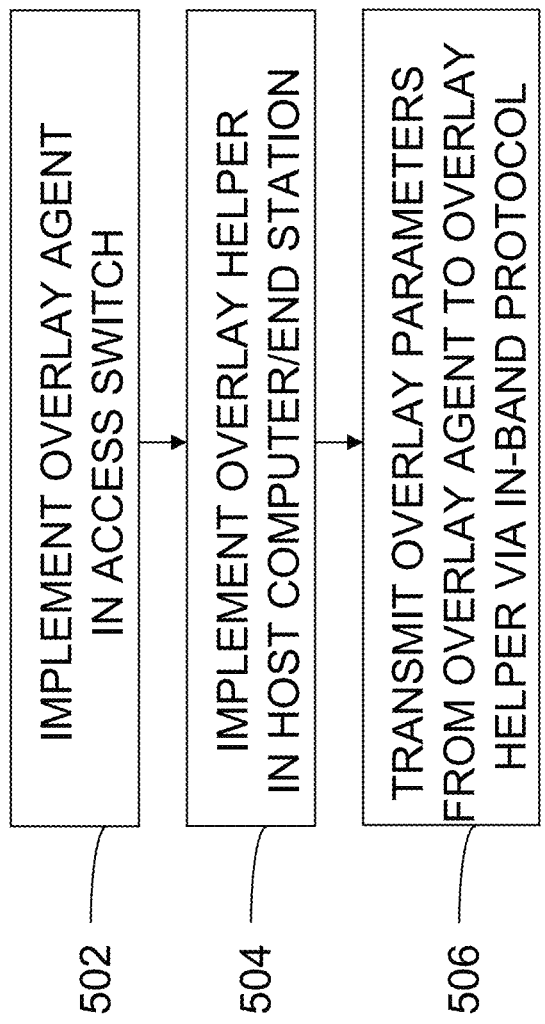
FIG. 5 is a flow diagram of a process for performing a virtual network overlay operation, in accordance with an embodiment.

FIG. 5 is a flow diagram of a method 500 for performing an overlay operation, in accordance with an embodiment. In describing the method 500, reference is also made to elements of FIGS. 1-4.

At block 502, the overlay agent 302 of the overlay system 300 can be implemented in the access switch 16 or related network edge device. As described above, the overlay agent 302 can include a management interface 306, a policy agent 308, an address handler 310, and a classifier 312A.

At block 504, the overlay helper 304 is implemented in the host computer 12. As described above, the overlay helper 304 can include an IP handler 314 and a classifier 312. In one embodiment, the overlay helper 304 is implemented in a hypervisor NIC driver. In another environment, the overlay helper 304 is implemented in an SR IOV NIC. In another environment, the overlay helper 304 is implemented in a legacy NIC, an OS NIC driver, and/or NIC firmware or hardware.

At block 506, overlay parameters can be transmitted from the overlay agent 302 to the overlay helper 304 via an in-band protocol. Classification criteria based on physical or virtual port numbers, MAC addresses, and the like can be exchanged prior to the start of a traffic flow between the two end stations. Policy cache entries and the like can be exchanged at the start of the traffic flow. Encapsulation can occur by adding an overlay header to a received packet, which includes IP and/or MAC address information, virtual network information, and/or related information for determining the destination end station of the packet in the overlay virtual network. Accordingly, by implementing an overlay system 300 in both an access switch and an end station, a virtual network can be scaled to include legacy devices in addition to virtualized devices, thereby reducing any dependency on hypervisor platforms and the like. In doing so, the overlay virtual network functionality can be separated from the operating system or hypervisor. Further, overlay header additions, deletions, or modifications performed by the overlay helper can occur in a hardware, firmware, or software layer below the host computer operating system. Thus, overlay functions can occur without the need to modify the operating system.

Figure 6:
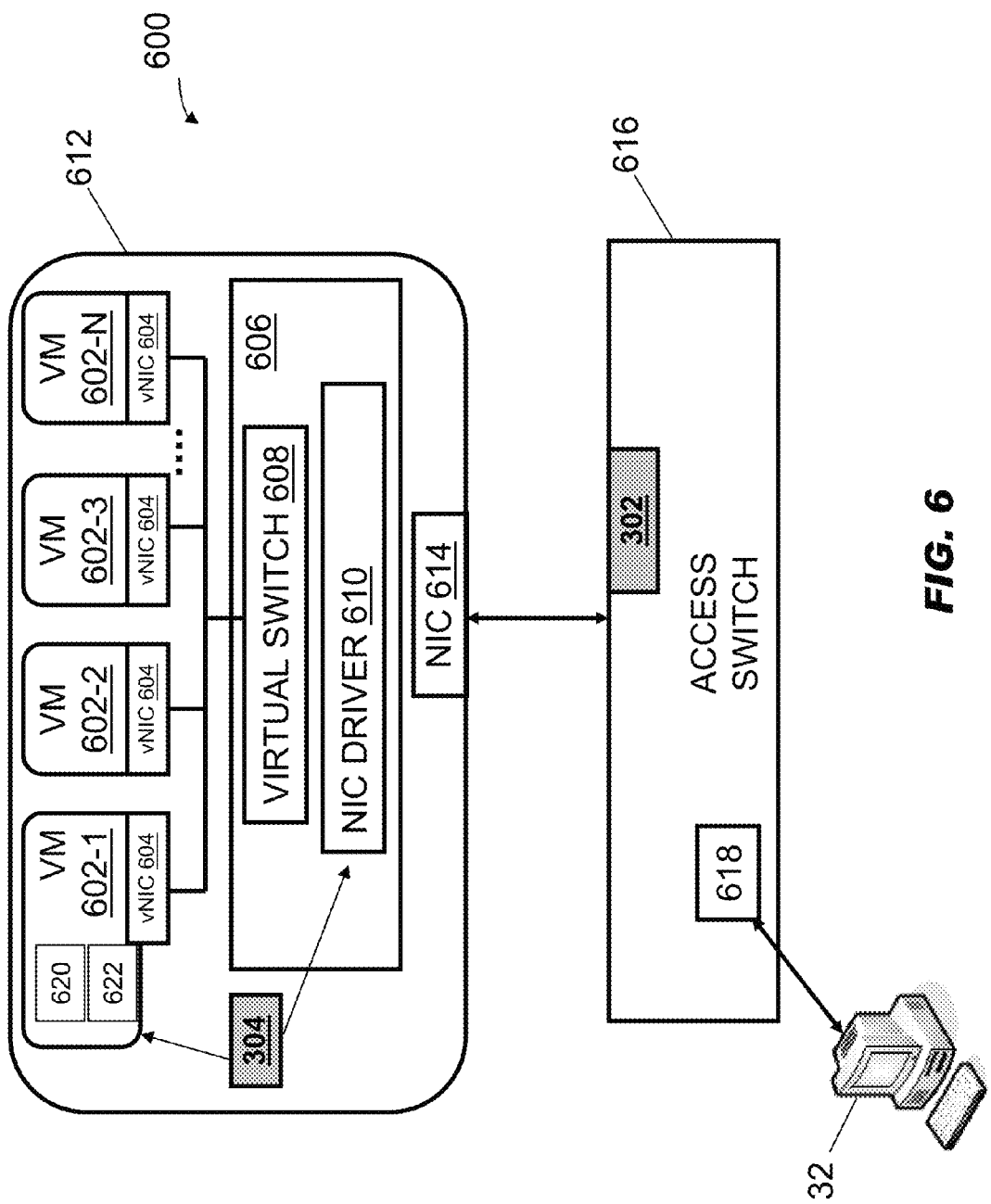
FIG. 6 is a block diagram of an environment including a host computer and an access switch configured with a virtual network overlay, in accordance with an embodiment.

FIG. 6 is a block diagram of an environment 600 including a host computer 612 and an access switch 616 configured with the virtual network overlay system 300, in accordance with an embodiment.

The host computer 612 includes a hypervisor 606 for abstracting the hardware of the host computer 12 into virtual machines 602-1 through 602-N (generally, 602). The virtual machines 602 share a physical network interface controller (NIC) 614 for performing external network I/O operations. The hypervisor 606 can include a software-based virtual switch 608, or vswitch, that provides interconnectivity among the virtual machines 602. The virtual switch 608 interfaces between the physical NIC 614 and a plurality of virtual NICs 604, or vNICs, of the virtual machines 602 for forwarding packets between the virtual machines 602 and the physical NIC 614. Each virtual machine 602 can have one or more associated vNICs 604. Each virtual machine 602 can also include a VM network stack 620 and a VM vNIC driver 622 that drives a corresponding vNIC 604. In general, each vNIC 604 operates like a physical network interface. For example, each vNIC 604 can be assigned a unique MAC (Media Access Control) address.

The vNICs 604 are logically connected to the physical NIC 614 through the hypervisor NIC driver 610 and the virtual switch 608. In an embodiment, the overlay helper 304 of the overlay system 300 is implemented in the hypervisor NIC driver 610, or alternatively in the NIC firmware or hardware.

The overlay agent 302 of the overlay system 300 can be implemented in the access switch 616. In another embodiment, the overlay helper 304 is implemented in the VM network stack 620. In another embodiment, the overlay helper 304 is implemented at the VM vNIC driver 622. In another embodiment, the overlay helper 304 is implemented in a combination of the VM network stack 620, the vNIC driver 622, and hypervisor NIC driver 610. The overlay agent 302 and the overlay helper 304 communicate with each other via an in-band protocol for transmitting overlay parameters, for example, classification criteria and policy cache data such as virtual network mapping information, between the overlay agent 302 and the overlay helper 304.

Figure 7:
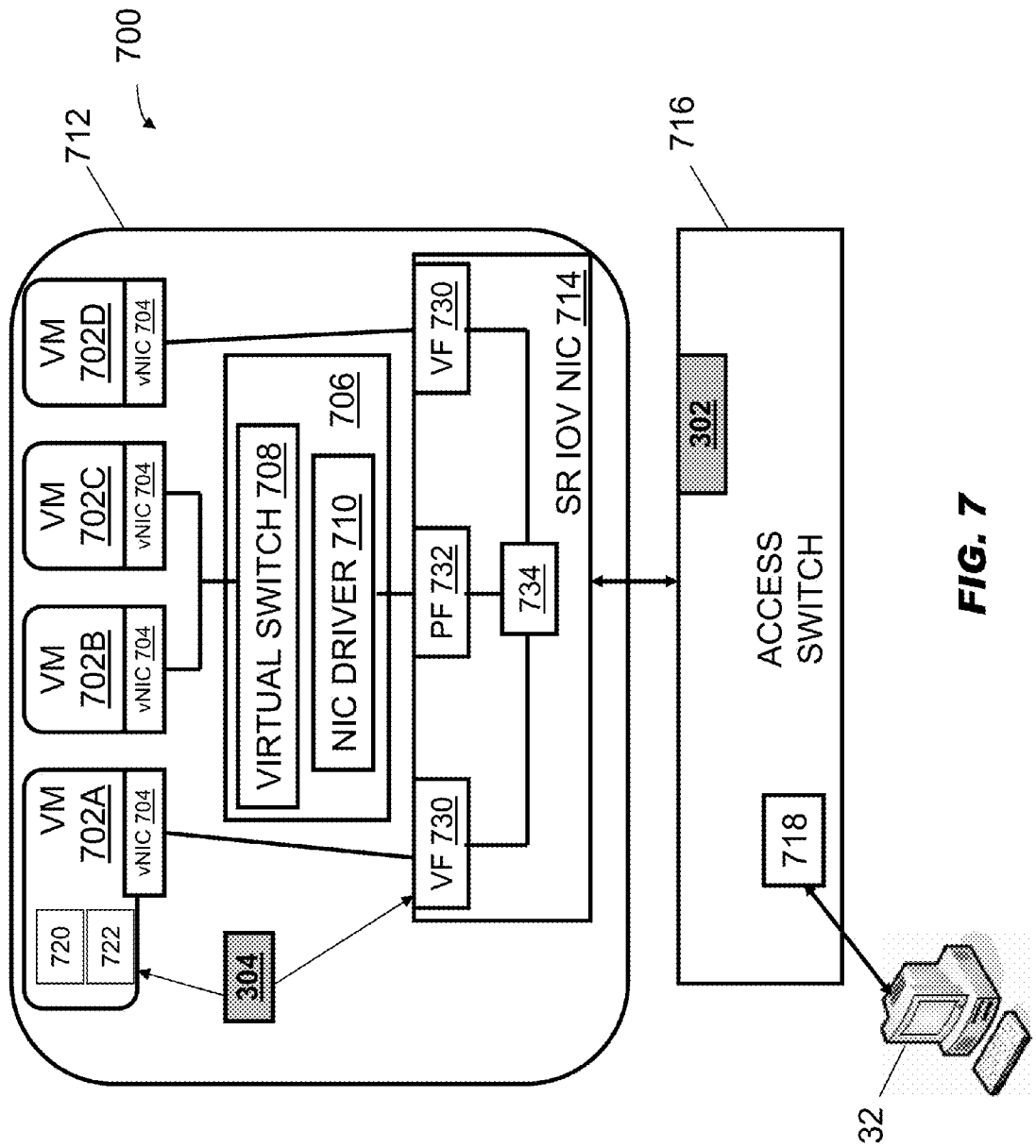
FIG. 7 is a block diagram of an environment including a host computer and an access switch configured with a virtual network overlay, in accordance with another embodiment.

FIG. 7 is a block diagram of an environment 700 including a host computer 712 and an access switch 716 configured with the virtual network overlay system 300, in accordance with another embodiment. The environment 700 is similar to the environment 600 described in FIG. 6, except that the environment 700 includes an SR-IOV NIC 714. Here, a vNIC 704 can be logically connected to the physical NIC 714 through a virtual function (VF) engine 730, which can include a virtualized instance of the NIC 714. A hypervisor NIC driver 710 can drive a physical function (PF) engine, similar to the configuration of FIG. 6 so that the hypervisor 706 can access the PF 732, which is the interface to the physical card. The VF engines 730 permit switching traffic performance to be improved by switching traffic between virtual machines 702 by bypassing the vswitch 708. Thus, VMs 702A, 702D can directly access the physical NIC 714 through the virtual functions without having to rely on the hypervisor 706 for control or data operations.

In an embodiment, the overlay helper 304 of the overlay system 300 is implemented in the NIC driver 710 which drives the PF 732, or in the NIC firmware or hardware. The overlay agent 302 of the overlay system 300 can be implemented in the access switch 616. In another embodiment, the overlay helper 304 is implemented in a VM network stack 720. In another embodiment, the overlay helper 304 is implemented at the VM vNIC driver 722. In another embodiment, the overlay helper 304 is implemented in a combination of the VM network stack 720, the vNIC driver 722, and the NIC driver 710.

Figure 8:
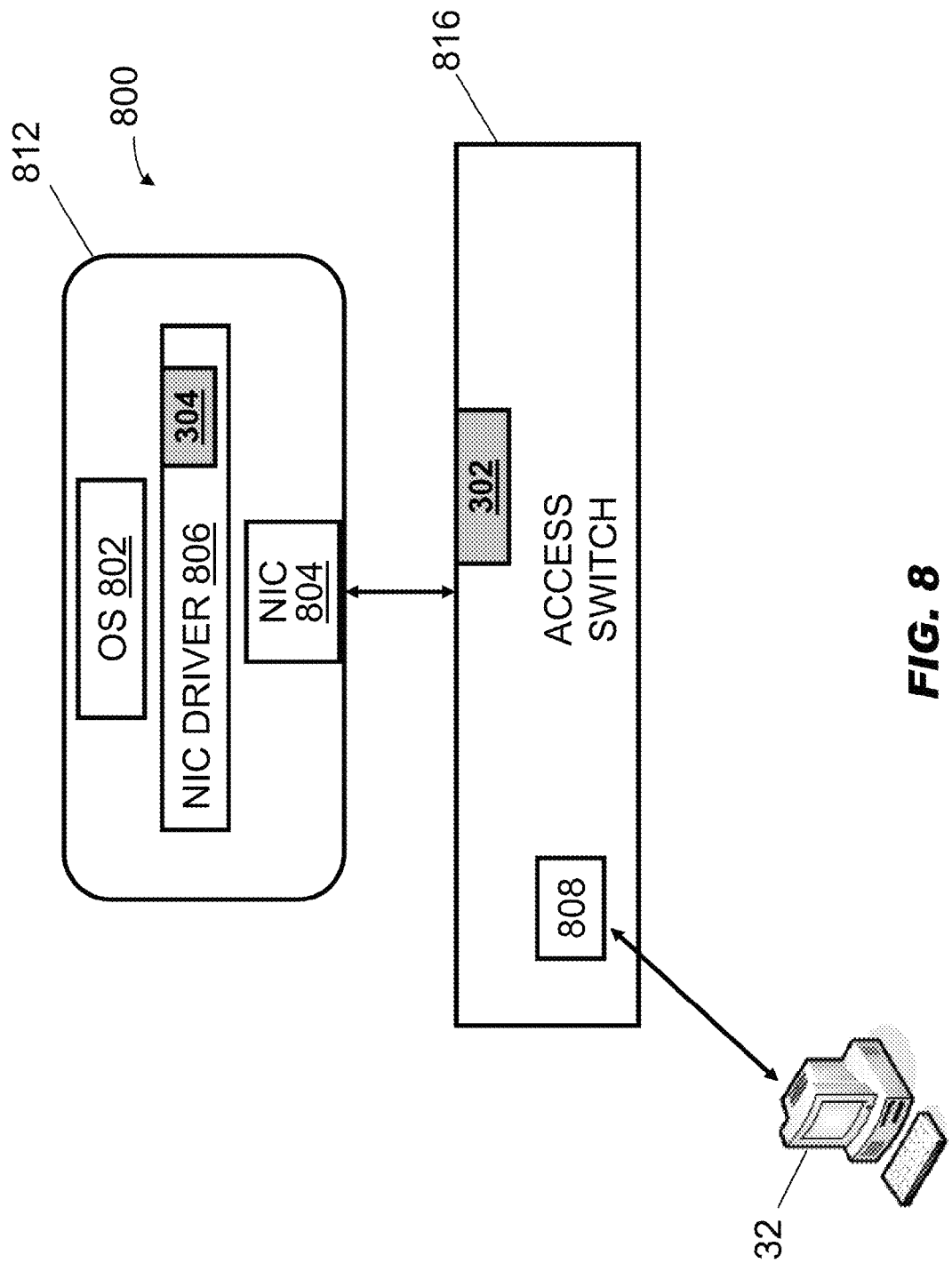
FIG. 8 is a block diagram of an environment including a host computer and an access switch configured with a virtual network overlay, in accordance with another embodiment.

FIG. 8 is a block diagram of an environment 800 including a host computer 812 and an access switch 816 configured with the virtual network overlay system 300, in accordance with another embodiment. The host computer 812 can include a conventional operating system, and does not require a hypervisor or VMM.

The host computer 812 can include a NIC 804 configured for network virtualization, for example, including queues each dedicated to a virtualized or non-virtualized entity on the physical host computer 12. Here, a unique MAC address can be assigned to each queue to distinguish the entities from each other. The overlay helper 304 of the overlay system 300 can be implemented in an OS NIC driver 806 that drives the NIC 804, or in the firmware or hardware of the NIC 804. The overlay agent 302 of the overlay system 300 can be implemented in the access switch 816. The overlay agent 302 and the overlay helper 304 communicate with each other via an in-band protocol, which can be configured to exchange overlay parameters and the like. Thus, both virtualized end stations and/or non-virtualized end stations can be part of a scalable overlay virtual network.

FIG. 9A is a schematic block diagram illustrating a process flow 900 for initializing a source overlay system, in accordance with an embodiment. FIG. 9B is a schematic block diagram illustrating a process flow 920 for initializing a destination overlay system, in accordance with an embodiment. In describing the process flows 900 and 920, reference is also made to FIGS. 1-8. In FIGS. 9A and 9B, two overlay systems corresponding to a source end station (ES1) and a destination end station, respectively, are initialized for permitting communication to occur between the two end stations in the same overlay virtual network. Each of the two overlay systems can refer to the overlay system 300 of FIG. 3, and/or the overlay systems 204, 208, respectively, of FIG. 2.

In FIG. 9A, the process flow 900 occurs between the source overlay helper 304 implemented in the source end station 202 (generally, 902), the source overlay agent 302 implemented in a source access switch (generally, 904), a management station in communication with the source access switch (generally, 906), and a topology mapper configured for the policy server 212 (generally, 908).

The management station 906 can output (910) an enable overlay request to the source access switch 904. The management station 906 can communicate with the management interface 306 of the source overlay agent 904 to enable the source overlay system 300 to classify packets, add an overlay header to a received packet, to communicate with the source overlay helper 902 via an in-band protocol, and/or to perform other functions of the overlay system 300 such as those described herein. The management station 906 can configure the request to enable a predetermined port of the source access switch for processing packets related to the overlay virtual network to which the source end station 202 belongs. The port can be designated to be in the user defined virtual network. Thus, packets output from that port are automatically classified to belong to the designated virtual network. The source overlay system 300 can perform the required encapsulation as described herein to transmit the packet through the physical network to the destination overlay system.

In response to being activated for a virtual overlay operation, the overlay agent 904 can output (912) address information, for example, the MAC address and/or the IP address of the source overlay agent 904, to the source overlay helper 902.

The management station 906 can send (914) a request to the topology mapper 908 via the management interface 306 for physical locations of the end stations to construct a topology map or determine placement criteria related to the overlay virtual network (OVNX) of which the source end station 202 is associated, i.e., source end station 902 can be a member of OVNX.

The management station 906 can output (916) topology mapping information received from the topology mapper 908 to the source overlay agent 904, specifically, to the policy agent 308. This information can be used by other overlay agents in a virtual network operation whereby communications occur, for example, when the end station 902 receives a packet from another end station, i.e., end station 902 is a destination end station. The topology mapping information can include a source end station MAC address, access switch port information, virtual network identifier, and the like.

Some or all elements of the topology mapping data, for example, source end station MAC address and virtual network identifier, can be output (918) to the overlay helper 902 for establishing a location of the source end station 202.

In FIG. 9B, a process flow 920 occurs between the overlay helper 304 implemented in the destination end station 206 (generally, 922), the overlay agent 302 implemented in a destination access switch (generally, 924), a management station in communication with the destination access switch (generally, 926), and the topology mapper configured for the policy server 212 (generally, 928). The destination access switch 924 can be the same switch or a similar switch as the source access switch 904 of FIG. 9A. The management station 926 can be the same or similar to the management station 906 of FIG. 9A. The topology mapper 928 can be the same as the topology mapper 908 of FIG. 9A.

The management station 926 can output (930) an enable overlay request to the destination access switch 924. The management station 926 can communicate with the management interface 306 of the destination overlay agent 924 to enable the overlay system 300 to classify packets, add an overlay header to a received packet, to communicate with the destination overlay helper 922 via an in-band protocol, and/or to perform other functions of the overlay system 300 such as those described herein. The management station 926 can configure the request to enable a predetermined port Q of the destination access switch for processing packets related to the overlay virtual network to which the destination end station 222 belongs.

In response to being activated for a virtual overlay operation, the overlay agent 924 can output (932) address information, for example, the MAC address and/or the IP address of the destination overlay agent 924, to the destination overlay helper 922.

The management station 926 can send (934) a request to the topology mapper 928 via the management interface 306 for end station location information to construct a topology map, determine placement criteria, etc., related to the overlay virtual network (OVNX) of which the destination end station 206 is associated, i.e., destination end station 922 can be a member of OVNX. The management station 926 can output (936) topology mapping information to the policy server 928 that is queried by the overlay agent 924 to establish a transmission path. This information can be used by other overlay agents in a virtual network operation, for example, when the end station is a destination end station. The topology mapping information can include a destination end station MAC address, access switch port information, virtual network identifier, and the like.

Some or all elements of the topology mapping data, for example, destination end station MAC address and virtual network identifier, can be output (938) to the overlay helper 922 for establishing a location of the destination end station 206.

Figure 10:
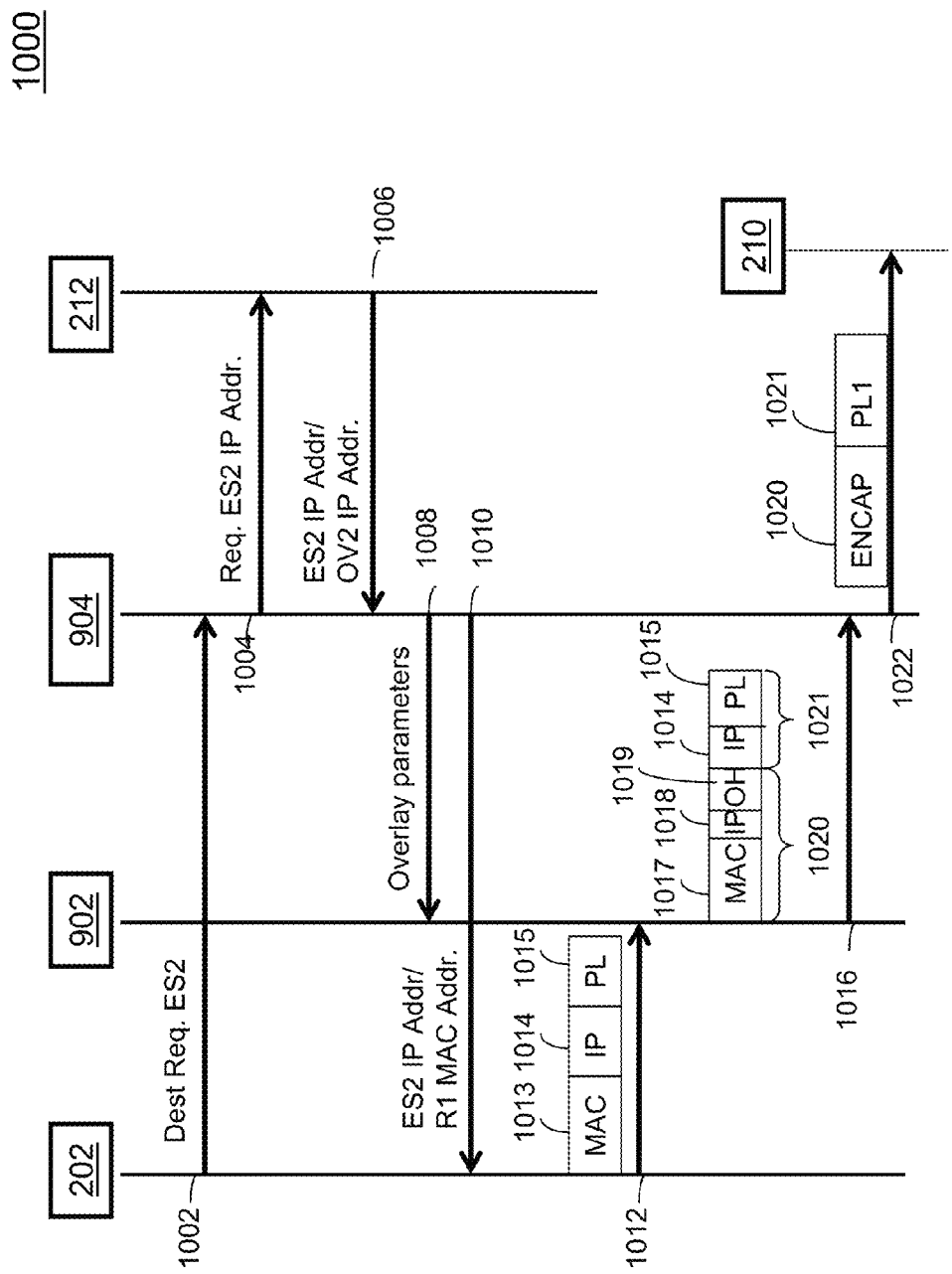
FIG. 10 is a schematic block diagram illustrating a process flow for communicating with a source overlay system, in accordance with an embodiment.

FIG. 10 is a schematic block diagram illustrating a process flow 1000 for communicating with a source overlay system, in accordance with an embodiment. In describing the process flow 1000, reference is also made to elements of FIGS. 1-9. In particular, the process flow 1000 is described as occurring between the first end station 202, the router 210, and the policy server 212 of FIG. 2 and the source overlay helper 304 implemented in the source end station 202 (generally, 902) and the source overlay agent 302 implemented in the source access switch (generally, 904) of FIG. 9. However, the process flow 1000 can equally apply between end stations and the access switches referred to in FIGS. 6-8 or in other figures described herein.

A destination request message is output (1002) from the end station 202 to the source overlay agent 904, for example, output as a broadcast message. The broadcast message can be output in a well-known manner, for example, issued according to the ARP for address resolution.

The address handler 310 of the source overlay agent 904 can receive the request via the classifier 312, and query the policy agent 308 for the IP address of the destination end station 206, for example, the virtual network (OVNX) of the source end station 202. The policy agent 308 of the source overlay agent 904 can first access its policy cache (not shown), which can store mapping information related to the destination end station 206 to which the source end station 202 wishes to communicate. The address handler 310 can communicate with the policy agent 308, which can check a local cache. If the mapping information is not found, the policy server 212 can provide the mapping information. A unicast message can be output (1004) to the policy server 212 to obtain the mapping information.

The policy server 212 can determine the physical location of the destination end station 206 according to approaches similar to those described above with regard to FIG. 4. Such approaches will not be repeated for reasons related to brevity. The policy server 212 can output (1006) the requested mapping information, specifically, a mapping of the IP address of the destination end station 206 to the destination overlay system. In addition, the policy agent 308 can communicate with the policy server 212 to determine the location of the destination end station 206, and to update the policy cache with the mapping information. The source overlay agent 904 can send (1008) overlay parameters such as classification criteria and policy cache data to the source overlay helper 902. For example, the source overlay agent 904 can send next-hop MAC and IP address data as well as related overlay encapsulation information, for example, described herein. The source overlay agent 904 can communicate with the source overlay helper 902 via an in-band protocol. The source overlay agent 904 can output (1010) the IP address of the destination end station 206 and a corresponding next hop MAC address to the end station 202.

End station 202 can output (1012) a packet. The packet can include a network packet, for example, a frame or an IP packet. The packet can include a destination MAC address 1013 and a destination IP address 1014 received from the source overlay helper 902. The packet can also include a payload (PL) 1015 and/or other fields having contents known to those of ordinary skill in the art.

The IP handler 314 of the source overlay helper 902 receives the packet from the end station 202. The IP handler 314 adds an overlay encapsulation 1020 to the packet and outputs (904) the encapsulated packet to the source access switch. The overlay encapsulation 1020 includes an outer overlay MAC header 1017, an outer overlay IP header 1018, and an overlay header 1019. The outer overlay MAC header 1017 includes a source MAC address (omac1) corresponding to the source access switch port and a next hop MAC address (rmac1). In an embodiment, if the target is in the same subnet as the source, then the destination MAC address is that of the destination overlay system 208. In another embodiment, as shown in FIG. 2, the destination MAC address is that of a router or gateway interface (R1) that routes packets between the subnets of the end stations 202, 206, respectively. The outer overlay IP header 1018 can include the IP address of the source overlay agent 904 and the IP address of the destination overlay agent. The overlay header 1019 can include a unique identifier that identifies the virtual network. When the overlay encapsulation 1020 is added to the packet received from the source end station 202, the contents of the original packet 1013, 1014, 1015 are combined to form a new payload PL1 1021, which is output (1016) with the overlay encapsulation 1020 from the overlay helper 902 to the source access switch having the source overlay agent 904, which in turn outputs (1022) the packet 1020, 1021 to the router 210, or to a network switch or related network device.

Figure 11:
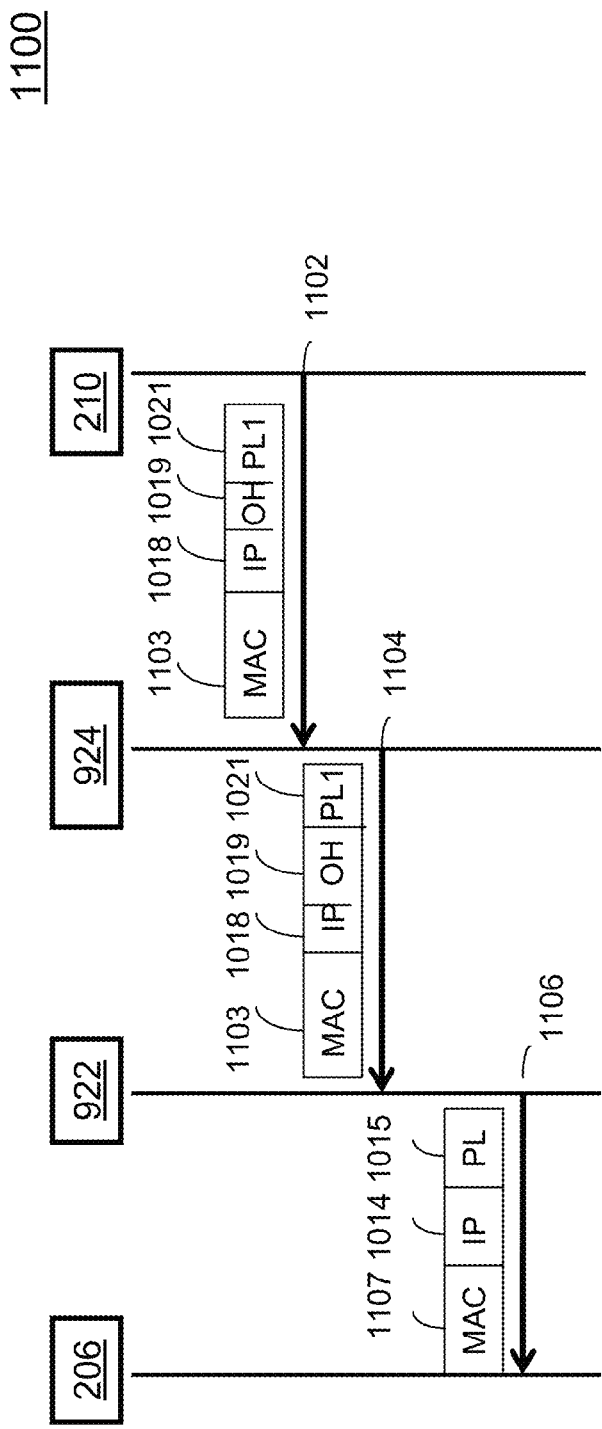
FIG. 11 is a schematic block diagram illustrating a process flow for communicating with a destination overlay system, in accordance with an embodiment.

FIG. 11 is a schematic block diagram illustrating a process flow 1100 for communicating with a destination overlay system, in accordance with an embodiment. In describing the process flow 1100, reference is also made to elements of FIGS. 1-10. In particular, the process flow 1100 is described as occurring between the second end station 206, the router 210 and the policy server of FIG. 2 and the destination overlay helper 304 implemented in the destination end station 206 (generally, 922) and the destination overlay agent 302 implemented in the destination access switch (generally, 924) of FIG. 9. However, the process flow 1100 can equally apply between end stations and access switches referred to in FIGS. 6-8 or in other figures described herein.

The process flow 1100 begins with the router 210 outputting (1102) the packet payload PL1 1021, the overlay header 1019, and the outer overlay IP header 1018 provided in the process flow 1000 to the destination access switch having the overlay agent 924, which in turn outputs (1104) this packet data to the destination overlay header 922. A MAC address header 1103 is added which can include the source MAC address, i.e., the MAC address of the router interface or access switch port outputting (1102) the packet payload PL1 1021. The MAC address header 1103 also includes the MAC address of the destination overlay agent 924.

The destination overlay helper 304 can remove the overlay header 1019 from the received frame and determines the destination end station 206 from the inner IP destination, i.e., ES2 IP address 1014, in the packet payload PL1 1021 and/or the virtual network identifier in the header 1019. A MAC header 1107 is added that includes the destination end station MAC address, which can be provided to the overlay helper 302 during the initialization process described in FIG. 9. Accordingly, the original payload PL 1015 can be directed to the intended destination end station 206.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. An overlay system for a network virtualization environment, comprising:
    an overlay agent at an access switch at the edge of a network, the overlay agent configured to generate overlay parameters related to a destination end station for an overlay encapsulation field; and
    an overlay helper at a host computer in communication with the access switch, the overlay helper configured to receive a first packet, add the overlay encapsulation field to the first packet and transmit the first packet including the overlay encapsulation field to a destination overlay system in communication with the destination end station that receives and processes the overlay parameters of the overlay encapsulation field, wherein the overlay system is constructed and arranged for permitting virtualized and non-virtualized end stations alike to be part of a same overlay virtual network.

2. The overlay system of claim 1, wherein the overlay helper further transmits a second packet to a correct destination end station in response to receiving the overlay encapsulation field from the overlay agent.

3. The overlay system of claim 1, wherein the overlay agent comprises:
    a management interface invoked by a management station for configuring the overlay parameters; and
    a policy agent that communicates with a policy server for obtaining data for mapping the destination end station to the overlay agent at the access switch.

4. The overlay system of claim 1, wherein the overlay helper comprises:
    an IP handler that adds an overlay encapsulation field to a packet received from the host computer and transmits the packet including the overlay encapsulation field to the destination end station; and
    a classifier that maps the packet to a virtual network.

5. The overlay system of claim 1, wherein the overlay helper is implemented in at least one of a hypervisor network interface (NIC) driver, a Single-Root I/O Virtualization (SR IOV) NIC, an operating system NIC driver, and NIC firmware.

6. A data center environment, comprising:
    a network edge switch;
    a host computer in communication with the access switch via a local area network connection; and
    an overlay system, the overlay system comprising an overlay agent at the access switch and an overlay helper at the host computer, the overlay agent configured to generate overlay parameters related to a destination end station for an overlay encapsulation field, the overlay helper to receive a first packet, add the overlay encapsulation field to the first packet and transmit the packet including the overlay encapsulation field to a destination overlay system in communication with the destination end station that receives and processes the overlay parameters of the overlay encapsulation field, wherein the overlay system is constructed and arranged for permitting virtualized and non-virtualized end stations alike to be part of a same overlay virtual network.

7. A computer program product for overlaying a virtual network on a physical network in a data center environment, the computer program product comprising:
    a computer readable storage medium having computer readable program code embodied therewith, the computer readable program code comprising;
        computer readable program code configured to arrange an overlay system in an overlay virtual network to include an overlay agent and an overlay helper, wherein the overlay system is constructed and arranged for permitting virtualized and non-virtualized end stations alike to be part of a same overlay virtual network;
        computer readable program code configured to implement the overlay agent in an access switch;
        computer readable program code configured to implement the overlay helper in a host computer that is in communication with the access switch;
        computer readable program code configured to add to a packet at the overlay helper an overlay encapsulation field having overlay parameters related to a destination end station; and
        computer readable program code configured to transmit the overlay parameters in compliance with an in-band protocol between the overlay agent and the overlay helper.

* * * * *